United States Patent
McNeil et al.

(10) Patent No.: US 9,909,803 B2
(45) Date of Patent: Mar. 6, 2018

(54) CRYOGENIC SEPARATION OF SYNTHESIS GAS

(71) Applicant: Air Products and Chemicals, Inc., Allentown, PA (US)

(72) Inventors: Brian Alfred McNeil, Surrey (GB); Andrew Weaver, Surrey (GB); David Graham Winter, Surrey (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 14/997,642

(22) Filed: Jan. 18, 2016

(65) Prior Publication Data

US 2016/0153710 A1 Jun. 2, 2016

Related U.S. Application Data

(60) Division of application No. 12/640,435, filed on Dec. 17, 2009, now abandoned, which is a
(Continued)

(51) Int. Cl.
*F25J 3/02* (2006.01)
*C01B 3/50* (2006.01)
*F25J 3/08* (2006.01)

(52) U.S. Cl.
CPC ............ *F25J 3/0223* (2013.01); *C01B 3/506* (2013.01); *F25J 3/0233* (2013.01); *F25J 3/0252* (2013.01); *F25J 3/0257* (2013.01); *F25J 3/0261* (2013.01); *F25J 3/0271* (2013.01); *F25J 3/08* (2013.01); *C01B 2203/046* (2013.01); *C01B 2203/047* (2013.01); *C01B 2203/048* (2013.01); *C01B 2203/0415* (2013.01); *C01B 2203/145* (2013.01); *C01B 2203/146* (2013.01); *C01B 2203/147* (2013.01); *F25J 2200/74* (2013.01); *F25J 2200/76* (2013.01); *F25J 2200/94* (2013.01); *F25J 2205/04* (2013.01); *F25J 2205/30* (2013.01); *F25J 2215/02* (2013.01); *F25J 2245/02* (2013.01);
(Continued)

(58) Field of Classification Search
CPC ......... F25J 3/0223; F25J 3/0261; F25J 3/0271
See application file for complete search history.

(56) References Cited

U.S. PATENT DOCUMENTS 3,095,294 A 6/1963 Knapp et al.
4,217,759 A 8/1980 Shenoy
(Continued)

FOREIGN PATENT DOCUMENTS

CN 1860338 A 11/2006
EP 0 928 937 A2 7/1999

*Primary Examiner* — John F Pettitt
(74) *Attorney, Agent, or Firm* — Bryan C. Hoke, Jr.

(57) ABSTRACT

A process and apparatus for separating a feed containing hydrogen, carbon monoxide, methane, and optionally nitrogen to form a product gas having a desired $H_2$:CO molar ratio and optionally a hydrogen product gas and a carbon monoxide product gas. The feed is partially condensed to form a hydrogen-enriched vapor fraction and a carbon monoxide-enriched liquid fraction. The hydrogen-enriched vapor fraction and carbon monoxide-enriched liquid fraction are combined in a regulated manner to form an admixture, which is cryogenically separated to form the product mixture having the desired $H_2$:CO molar ratio.

5 Claims, 4 Drawing Sheets

Related U.S. Application Data continuation-in-part of application No. 12/416,439, filed on Apr. 1, 2009, now abandoned.

(52) U.S. Cl.
CPC ........ *F25J 2270/02* (2013.01); *F25J 2270/04* (2013.01); *F25J 2270/24* (2013.01)

(56) References Cited

U.S. PATENT DOCUMENTS

| | | | |
|---|---|---|---|
| 4,488,890 A | 12/1984 | Foerg et al. | |
| 4,525,187 A | 6/1985 | Woodward et al. | |
| 4,566,886 A | 1/1986 | Fabian et al. | |
| 4,888,035 A | 12/1989 | Bauer | |
| 5,133,793 A | 7/1992 | Billy | |
| 5,351,491 A | 10/1994 | Fabian | |
| 5,609,040 A | 3/1997 | Billy et al. | |
| 5,832,747 A | 11/1998 | Bassett et al. | |
| 6,062,042 A | 5/2000 | McNeil et al. | |
| 6,070,430 A | 6/2000 | McNeil et al. | |
| 6,073,461 A | 6/2000 | McNeil et al. | |
| 6,082,134 A | 7/2000 | McNeil et al. | |
| 6,094,938 A | 8/2000 | McNeil et al. | |
| 6,161,397 A | 12/2000 | McNeil et al. | |
| 6,269,657 B1 | 8/2001 | McNeil | |
| 6,289,693 B1 | 8/2001 | O'Brien | |
| 6,467,306 B2 | 10/2002 | McNeil | |
| 7,617,701 B2 | 11/2009 | Billy et al. | |
| 2007/0056319 A1* | 3/2007 | Billy | C01B 3/506 62/620 |
| 2007/0151291 A1 | 7/2007 | Fauroux | |
| 2009/0193846 A1* | 8/2009 | Foral | C01B 3/506 62/620 |
| 2010/0071411 A1 | 3/2010 | Darde et al. | |

* cited by examiner

CRYOGENIC SEPARATION OF SYNTHESIS GAS

CROSS-REFERENCE TO RELATED APPLICATIONS

This application is a divisional of U.S. application Ser. No. 12/640,435, filed Dec. 17, 2009, which is a continuation-in-part of U.S. application Ser. No. 12/416,439, filed Apr. 1, 2009, (abandoned), all of which are hereby incorporated by reference.

BACKGROUND

The present invention relates to the preparation of a gaseous mixture containing a desired molar ratio of hydrogen and carbon monoxide from a feed containing these components in a different molar ratio. It has particular, but not exclusive, application to the provision of synthesis gas containing hydrogen and carbon monoxide in a molar ratio of, for example 1:1.

Synthesis gas (syngas) is a gaseous mixture consisting essentially of hydrogen and carbon monoxide, which, depending upon the level of purity, can contain small amounts of argon, nitrogen, methane and other trace hydrocarbon impurities. Usually, it is obtained by catalytic conversion or partial oxidation of coal, coke, natural gas, or other hydrocarbon feeds. The primary uses of syngas are in the synthesis of methanol (requiring a hydrogen:carbon monoxide ($H_2$:CO) molar ratio of 2:1) and in reactions to produce oxo-alcohols (requiring a $H_2$:CO molar ratio of at least 1:1).

For many of these applications, it is necessary to control the relative proportions of hydrogen and carbon monoxide. Typically, this is achieved by cryogenically separating crude syngas into hydrogen-rich and carbon monoxide-rich product streams and then combining them in the appropriate ratio to produce the required syngas composition. The level of impurities, especially methane and other hydrocarbons, in the crude syngas usually also is reduced during the cryogenic separation.

Industry wants to efficiently produce a purified syngas having a desired $H_2$:CO molar ratio at high pressure from a cryogenic separation without additional compression.

Industry wants to reduce power requirements for compressing syngas product streams.

Industry wants to reduce the amount and/or size of capital equipment and associated costs for syngas production.

Industry wants to efficiently produce syngas having a desired $H_2$:CO molar ratio along with a hydrogen product gas and/or a carbon monoxide product gas.

Related disclosures include: U.S. Pat. Nos. 4,217,759, 4,488,890, 4,525,187, 4,566,886, 5,351,491, 5,609,040, 5,832,747, and 6,161,397, incorporated herein by reference in their entirety.

BRIEF SUMMARY

The present invention relates to a process and apparatus for separating a feed comprising hydrogen, carbon monoxide, methane, and optionally nitrogen to form a product gas having a desired $H_2$:CO molar ratio. The process and apparatus may also form a hydrogen product gas and a carbon monoxide product gas.

The process comprises:
partially condensing the feed to provide a hydrogen-enriched vapor fraction and a carbon monoxide-enriched liquid fraction;
combining at least a portion of the carbon monoxide-enriched liquid fraction with a regulated portion of the hydrogen-enriched vapor fraction to form a two-phase admixture having a vapor fraction and a liquid fraction; and
cryogenically separating at least a portion of the two-phase admixture in a first fractionator to form a first product gas and a hydrogen-depleted liquid fraction, wherein the first product gas has a $H_2$:CO molar ratio between 0.5 and 2.5, or between 0.9:1 and 1.5:1, or between 0.9:1 and 1.1:1;
wherein at least one of the liquid fraction of the two-phase admixture and the at least a portion of the carbon monoxide-enriched liquid fraction are partially vaporized.

The step of cryogenically separating at least a portion of the two-phase admixture may comprise:
separating the at least a portion of the two-phase admixture in the first fractionator to form a methane-depleted vapor fraction and the hydrogen-depleted liquid fraction;
partially condensing the methane-depleted vapor fraction to form the first product gas and a condensate; and
introducing at least a portion of the condensate into the first fractionator as reflux.

The process may further comprise:
scrubbing a second portion of the hydrogen-enriched vapor fraction, or a vapor portion from phase separation thereof, with a liquid methane wash stream to provide a hydrogen product gas and a carbon monoxide-loaded methane liquid.

Alternatively or additionally, the process may further comprise:
stripping hydrogen from a second portion of the carbon monoxide-enriched liquid fraction and at least a portion of the hydrogen-depleted liquid fraction in a second fractionator to form a second hydrogen-enriched vapor fraction and a hydrogen-free liquid fraction; and
separating an intermediate feed comprising carbon monoxide and methane in a carbon monoxide/methane fractionator to form a carbon monoxide product gas and a methane-enriched liquid fraction, wherein the intermediate feed is formed from at least a portion of the hydrogen-free liquid fraction.

Alternatively, or additionally, the process may further comprise:
condensing a CO-containing vapor feed to provide a CO-containing condensate; and
introducing at least a portion of the CO-containing condensate into the first fractionator as reflux.

Alternatively, additionally, the process may further comprise:
condensing a CO-containing vapor feed to provide a CO-containing condensate; and
introducing a first portion of the CO-containing condensate into the carbon monoxide/methane fractionator as reflux and introducing a second portion of the CO-containing condensate into the first fractionator as reflux.

Alternatively, or additionally, the process may further comprise:
stripping hydrogen from a second portion of the carbon monoxide-enriched liquid fraction and at least a portion of the hydrogen-depleted liquid fraction in a second fractionator to form a second hydrogen-enriched vapor fraction and a hydrogen-freed liquid fraction;

separating an intermediate feed comprising carbon monoxide and methane in a carbon monoxide/methane fractionator to form a carbon monoxide product gas, a methane-enriched liquid fraction, and a second methane-enriched liquid fraction, wherein the intermediate feed is formed from at least a portion of the hydrogen-freed liquid fraction; and vaporizing the second methane-enriched liquid fraction by indirect heat exchange with the feed to partially condense the feed.

Alternatively, the process may further comprise:

stripping hydrogen from a second portion of the carbon monoxide-enriched liquid fraction and at least a portion of the hydrogen-depleted liquid fraction in a second fractionator to form a second hydrogen-enriched vapor fraction and a hydrogen-freed liquid fraction;

separating at least a portion of the hydrogen-freed liquid fraction in a third fractionator to form a nitrogen-enriched vapor fraction and a nitrogen-depleted liquid fraction;

forming an intermediate feed from at least a portion of the nitrogen-depleted liquid fraction; and separating the intermediate feed in a carbon monoxide/methane fractionator to form a carbon monoxide product gas and a methane-enriched liquid fraction.

Alternatively the process may further comprise:

stripping hydrogen from a second portion of the carbon monoxide-enriched liquid fraction and at least a portion of the hydrogen-depleted liquid fraction in a second fractionator to form a second hydrogen-enriched vapor fraction and a hydrogen-freed liquid fraction;

separating at least a portion of the hydrogen-freed liquid fraction in a third fractionator to form a nitrogen-enriched vapor fraction and a nitrogen-depleted liquid fraction;

dividing the nitrogen-depleted liquid fraction into a first nitrogen-depleted stream and a second nitrogen-depleted stream;

partially vaporizing the first nitrogen-depleted stream to form a partially vaporized nitrogen-depleted stream; and separating the partially vaporized nitrogen-depleted stream and the second nitrogen-depleted stream in a carbon monoxide/methane fractionator to form a carbon monoxide product gas and a methane-enriched liquid fraction.

The methane-enriched liquid fraction may be used to form at least a portion of the liquid methane wash stream.

The apparatus for separating a feed comprising hydrogen, carbon monoxide, methane, and optionally nitrogen, comprises:

a first heat exchanger for partially condensing the feed to form a partially condensed feed;

a phase separator for separating the partially condensed feed into a hydrogen-enriched vapor fraction and a carbon monoxide-enriched liquid fraction;

a means for feeding the partially condensed feed to the phase separator from the first heat exchanger;

a means for combining a regulated portion of the hydrogen-enriched vapor fraction with a portion or all of the carbon monoxide-enriched liquid fraction to form a two-phase admixture, a means for feeding at least one of the portion or all of the carbon monoxide-enriched liquid fraction and at least a portion of the two-phase admixture to the first heat exchanger;

the first fractionator for cryogenically separating the at least a portion of the two-phase admixture to form a first product gas and a hydrogen-depleted liquid fraction; and a means for feeding the at least a portion of the two-phase admixture to the first fractionator.

The apparatus may further comprise:

a methane wash column for scrubbing a second portion of the hydrogen-enriched vapor fraction, or a vapor portion from phase separation thereof, with a liquid methane wash stream to provide a hydrogen product gas and a carbon monoxide-loaded methane liquid; and a means for feeding the second portion of the hydrogen-enriched vapor fraction, or a vapor portion from phase separation thereof, to the methane wash column from the phase separator.

The apparatus may further comprise:

a second fractionator for stripping hydrogen from a second portion of the carbon monoxide-enriched liquid fraction and at least a portion of the hydrogen-depleted liquid fraction to form a second hydrogen-enriched vapor fraction and a hydrogen-freed liquid fraction;

a means for feeding the second portion of the carbon monoxide-enriched liquid fraction to the second fractionator from the phase separator;

a means for feeding the at least a portion of the hydrogen-depleted liquid fraction to the second fractionator from the first fractionator;

a carbon monoxide/methane fractionator for separating an intermediate feed to form a carbon monoxide product gas and a methane-enriched liquid fraction; and a means for feeding at least a portion of the hydrogen-freed liquid fraction to the carbon monoxide/methane fractionator from the second fractionator.

Alternatively, the apparatus may further comprise:

a second fractionator for stripping hydrogen from a second portion of the carbon monoxide-enriched liquid fraction and at least a portion of the hydrogen-depleted liquid fraction to form a second hydrogen-enriched vapor fraction and a hydrogen-freed liquid fraction;

a means for feeding the second portion of the carbon monoxide-enriched liquid fraction to the second fractionator from the phase separator;

a means for feeding the at least a portion of the hydrogen-depleted liquid fraction to the second fractionator from the first fractionator;

a third fractionator for separating at least a portion of the hydrogen-freed liquid fraction to form a nitrogen-enriched vapor fraction and a nitrogen-depleted liquid fraction;

a means for feeding the hydrogen-freed liquid fraction to the third fractionator from the second fractionator;

a carbon monoxide/methane fractionator for separating at least a portion of the nitrogen-depleted liquid fraction to form a carbon monoxide product gas and a methane-enriched liquid fraction; and a means for feeding the at least a portion of the nitrogen-depleted liquid fraction to the carbon monoxide/methane fractionator from the third fractionator.

The apparatus may further comprise a means for feeding a portion of the methane-enriched liquid fraction to the methane wash column from the carbon monoxide/methane fractionator.

DETAILED DESCRIPTION

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The phrase "at least a portion" means "a portion or all."

For the purposes of simplicity and clarity, detailed descriptions of well-known devices, circuits, and methods are omitted so as not to obscure the description of the present invention with unnecessary detail.

As used herein a "fractionator" includes such devices as distillation columns, flash drums, rectification columns, stripping columns and the like.

The present invention will be better understood with reference to FIGS. 1 through 4.

A process and apparatus are for producing a product gas having a desired $H_2$:CO molar ratio from a feed comprising hydrogen, carbon monoxide, methane, and optionally nitrogen. The feed may contain small amounts of other components.

Figure 1:
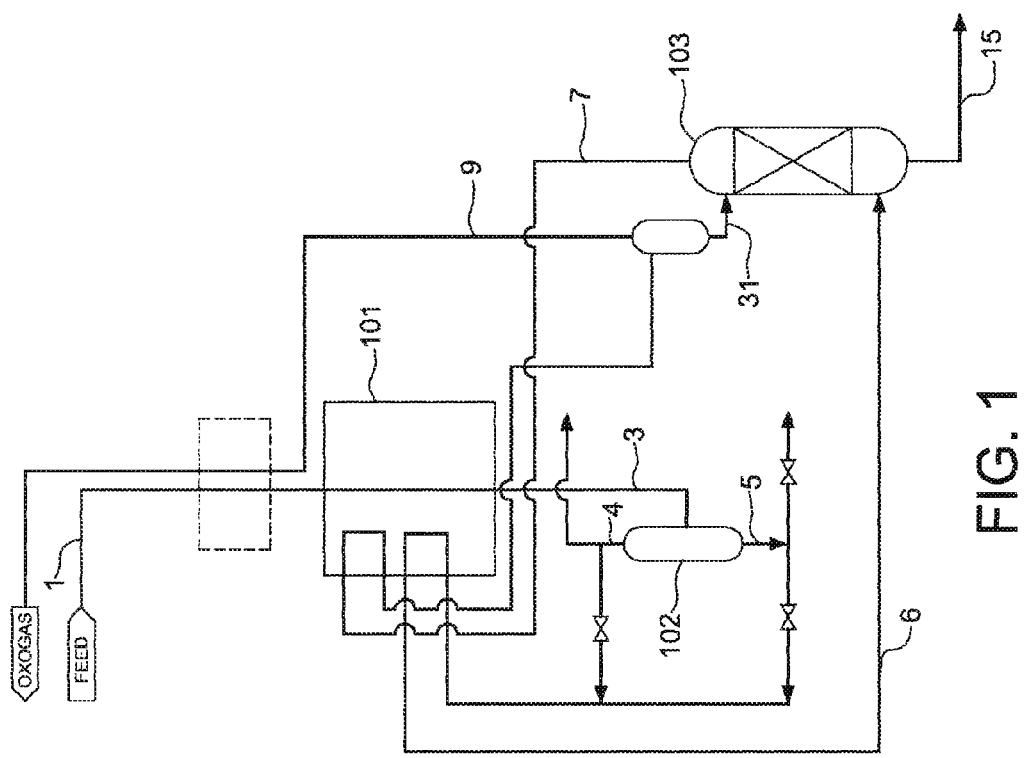
FIG. 1 illustrates a process flow diagram for producing a product gas having a desired $H_2$:CO molar ratio.
Figure 2:
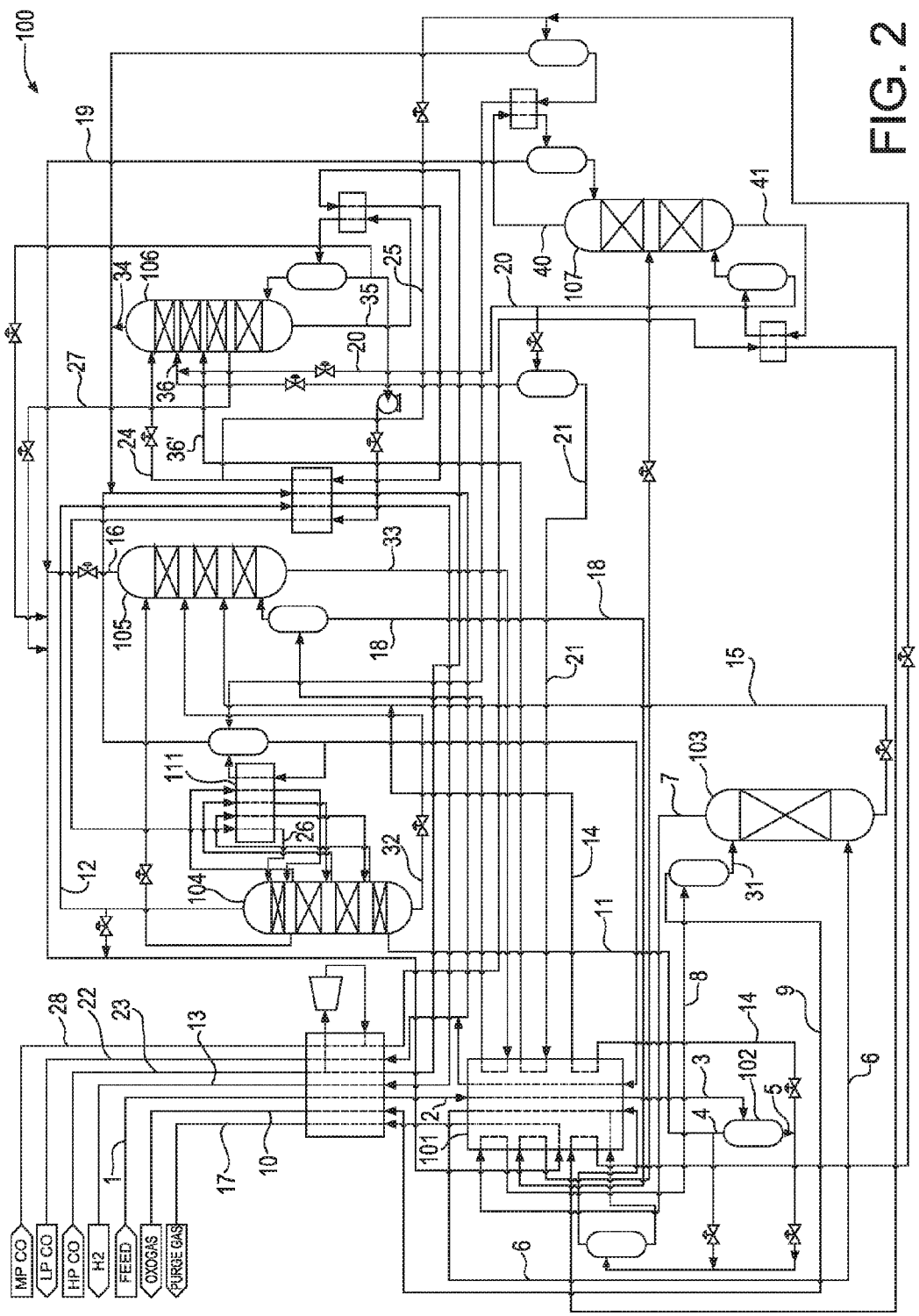
FIG. 2 illustrates an exemplary process flow diagram 100 for producing a product gas having a desired $H_2$:CO molar ratio as well as a hydrogen product gas and a carbon monoxide product gas.

With reference to FIG. 1 and FIG. 2, the feed 1 is partially condensed in heat exchanger 101 to form partially condensed feed 3 and separated in phase separator 102 to form hydrogen-enriched vapor fraction 4 and carbon monoxide-enriched liquid fraction 5. The phase separator 102 is in downstream fluid flow communication with heat exchanger 101. The phase separator 102 is connected to heat exchanger 101 by a means for feeding the partially condensed feed 3 to the phase separator 102 from heat exchanger 101. The means for feeding the partially condensed feed may include any known means for conveying a fluid, for example conduits, pipes, tubes and the like, as well as valves and other vessels.

The term "enriched" means having a greater mole % concentration of the indicated gas than the original stream from which it was formed. Then, the hydrogen-enriched vapor fraction has a greater hydrogen mole % concentration than the feed. Likewise, the carbon monoxide-enriched liquid fraction has a greater carbon monoxide mole % concentration than the feed.

Since the articles "a" and "an" as used herein mean one or more when applied to any feature, more than one hydrogen-enriched vapor fraction 4 and more than one carbon monoxide-enriched liquid fraction 5 may be formed from feed 1.

A portion or all of the carbon monoxide-enriched liquid fraction 5 is combined with a regulated portion of the hydrogen-enriched vapor fraction 4 to form two-phase admixture 6 having a vapor fraction and a liquid fraction. The portion or all of the carbon monoxide-enriched liquid fraction 5 and the regulated portion of the hydrogen-enriched vapor fraction 4 may be combined using any means for combining said streams, for example, pipe T junctions, tanks, vessels or other device having at least two inlets and at least one outlet.

At least a portion of the liquid fraction of the two-phase admixture 6 and/or at least a portion of the carbon monoxide-enriched liquid fraction 5 are partially vaporized in the heat exchanger 101 to convert a portion thereof to the vapor fraction. These streams may be fed to heat exchanger 101 by a means for feeding said streams, for example, conduits, pipes, tubes and the like, valves, vessels or other known means for conveying fluids.

At least a portion of the two-phase admixture 6 is cryogenically separated in fractionator 103 to form a methane-depleted vapor fraction 7 and a hydrogen-depleted liquid fraction 15. The two-phase admixture 6 is fed to fractionator 103 by a means for feeding the two-phase admixture 6, for example conduits, pipes, tubes and the like, valves, vessels or other known means for conveying fluids. Methane-depleted vapor fraction 7 is partially condensed in heat exchanger 101 and the resultant stream is separated to form the product gas 9 and a condensate 31. At least a portion of the condensate 31 is introduced into fractionator 103 as reflux. The benefit of using fractionator 103 is to decrease the methane concentration in the product gas 9 and allows for higher concentrations of methane in the feed 1.

The term "depleted" means having a lesser mole % concentration of the indicated gas than the original stream from which it was formed. Then, the methane-depleted vapor fraction 7 has a lesser methane mole % than the two-phase admixture 6 and the hydrogen-depleted liquid fraction 15 has a lesser hydrogen mole % than the two-phase admixture 6.

As used in this application, the terms "cryogenic separation," "cryogenically separating" mean that a mixture is separated by a separation process, for example condensation, distillation and/or fractionation, operating with a minimum temperature below the temperature required to condense at least one component from the mixture at operating pressure. Usually, said minimum temperature will be below −60° F. (−50° C.), preferably below −150° F. (−100° C.).

Non-cryogenic separation includes other forms of separation, for example sorption and membrane separation.

At least a portion of the two-phase admixture 6 is cryogenically separated in fractionator 103 to form a product gas 9 and a hydrogen-depleted liquid fraction 15. Product gas 9 has the desired $H_2$:CO molar ratio, which may be between 0.5:1 and 2.5:1 or between 0.9:1 and 1.5:1 or between 0.9:1 and 1.1:1. The desired $H_2$:CO molar ratio is generally different to the $H_2$:CO molar ratio of the feed 1, thus suitable for downstream processing without further compression. An advantage of the present process and apparatus is to provide a product gas with a desired $H_2$:CO molar ratio at a suitable pressure without further compression.

The portion of the hydrogen-enriched vapor fraction 4 is regulated (i.e. adjusted) to affect the $H_2$:CO molar ratio of the product gas 9. The total flow rate of the product gas 9 may be controlled by adjusting the quantity of carbon monoxide-enriched liquid fraction 5 and the $H_2$:CO molar ratio may be controlled by adjusting the quantity of hydrogen-enriched vapor fraction 4. Flow rates may be regulated by valves or other known means. The composition of the product gas 9 may be measured, a signal sent to a controller where the controller provides a signal to the valve(s) to adjust the flow rates in a prescribed manner. The flow rate of the carbon monoxide-enriched liquid fraction 5 is increased when an increase in the total flow rate of the product gas 9 is desired. The flow rate of the hydrogen-enriched vapor fraction is increased when an increase in the $H_2$:CO molar ratio is desired. The flow rate of the hydrogen-enriched vapor fraction is decreased when a decrease in the $H_2$:CO molar ratio is desired. Product gas 9 may exchange heat with other process streams as shown before being withdrawn from the system.

Production of a hydrogen product gas and carbon monoxide product gas in addition to the product gas having the desired $H_2$:CO molar ratio is described with reference to FIG. 2.

A second portion 11 of hydrogen-enriched vapor fraction 4 is scrubbed with a liquid methane wash stream 26 in methane wash column 104 to provide hydrogen product gas 12 and carbon monoxide-loaded methane liquid 32. Heat of absorption is removed in heat exchanger 111 using liquid carbon monoxide as refrigerant. The second portion 11 of hydrogen-enriched vapor fraction 4 is fed to methane wash column 104 by a means for feeding the second portion 11 for example, conduits, pipes, tubes and the like, valves, vessels or other known means for conveying fluids. Hydrogen product gas 12 may exchange heat with various process streams as shown before being withdrawn from the system. Optionally, a small portion of the stream withdrawn to form the hydrogen product gas 12 may be taken off and blended to form the purge gas stream 17.

Liquid washing is a well-known unit operation or process step where a liquid, for example methane, is used to absorb a preferentially absorbed component from a feed stream. For example a liquid methane wash may be used to preferentially absorb carbon monoxide from a stream containing hydrogen and carbon monoxide so that substantially pure hydrogen may be removed as a gaseous product. A wash column is a device in which liquid washing occurs.

Hydrogen is stripped from a second portion 14 of the carbon monoxide-enriched liquid fraction 5 and hydrogen-depleted liquid fraction 15 in fractionator 105 to form hydrogen-enriched vapor fraction 16 and hydrogen-freed liquid fraction 18. The hydrogen-enriched vapor fraction 16 is reduced in pressure and mixed with other reject streams, warmed in heat exchangers and leaves the process as purge gas stream 17. Fractionator 105 is reboiled in part of heat exchanger 101. The hydrogen-freed liquid fraction 18 is subcooled in heat exchanger 101, and reduced in pressure. Fractionator 105 is in downstream fluid flow communication of phase separator 102. Fractionator 105 is connected to phase separator 102 by a means for feeding the second portion 14 of the carbon monoxide-enriched liquid fraction 5. Fractionator 105 is in downstream fluid flow communication of fractionator 103. Fractionator 105 is connected to fractionator 103 by a means for feeding hydrogen-depleted liquid fraction 15 to fractionator 105 from fractionator 103. The means for feeding the second portion 14 of the carbon monoxide-enriched liquid fraction 5 and the means for feeding hydrogen-depleted liquid fraction 15 may include any known means for conveying a fluid, for example conduits, pipes, tubes and the like, as well as valves and other vessels. Carbon monoxide-enriched liquid fraction 14 may be heated in heat exchanger 101 prior to being introduced into fractionator 105.

As used herein, "hydrogen-freed" means containing less than 1 mole % hydrogen.

At least a portion of the hydrogen-freed liquid fraction 18 may be further processed to form an intermediate feed 36, 36' which is separated in carbon monoxide/methane fractionator 106 to form a carbon monoxide product gas 34 and a methane-enriched liquid fraction 35. Carbon monoxide/methane fractionator 106 is in downstream fluid flow communication of fractionator 105. Carbon monoxide/methane fractionator 106 is connected to fractionator 105 by a means for feeding hydrogen-freed liquid 18 to carbon monoxide/methane fractionator 106 from fractionator 105. The means for feeding hydrogen-freed liquid fraction 18 may include any known means for conveying a fluid, for example conduits, pipes, tubes and the like, as well as valves and other columns and vessels.

Optionally, in case it is desired to remove nitrogen, hydrogen-freed liquid fraction 18 may be separated in fractionator 107 to form a nitrogen-enriched vapor fraction 40 and a nitrogen-depleted liquid fraction 41. If used, fractionator 107 is in downstream fluid flow communication of fractionator 105. Fractionator 107 is connected to fractionator 105 by a means for feeding the hydrogen-freed liquid fraction 18. The means for feeding the hydrogen-freed liquid fraction 18 may include any known means for conveying a fluid, for example conduits, pipes, tubes and the like, as well as valves and vessels. A portion of nitrogen-depleted liquid fraction 41 may be heated and introduced into fractionator 107 as reboil.

At least a portion of nitrogen-depleted liquid fraction 41 is used to form intermediate feed 36, 36', which is introduced into and separated in carbon monoxide/methane fractionator 106 to form carbon monoxide product gas 34 and methane-enriched liquid fraction 35. Carbon monoxide/methane fractionator 106 is connected to fractionator 107 by a means for feeding the intermediate feed 36, 36'. The means for feeding intermediate feed 36, 36' may include any known means for conveying fluid, for example conduits, pipes, tubes and the like, as well as valves and vessels.

A portion of nitrogen-depleted liquid fraction 41 may be divided into a first nitrogen-depleted stream 21 and a second nitrogen depleted stream 20. The first nitrogen-depleted stream 21 may be partially vaporized in heat exchanger 101 and fed to carbon monoxide/methane fractionator 106 as part of intermediate feed 36, 36'. The partially vaporized nitrogen-depleted stream and the second nitrogen-depleted stream 20 are separated in carbon monoxide/methane fractionator 106 to form carbon monoxide product gas 34 and methane-enriched liquid fraction 35.

A portion of methane-enriched liquid fraction 35 is heated to provide vapor boil-up, which is returned to carbon monoxide/methane fractionator 106 to provide stripping vapor. A portion of methane-enriched liquid fraction 35 may be used to form at least a portion of liquid methane wash stream 26. The benefit of forming the liquid methane wash stream from the liquid bottoms of carbon monoxide/methane fractionator 106 is that little methane from outside the system is required and the methane is already cold. Methane wash column 104 is in downstream fluid flow communication of the carbon monoxide/methane fractionator 106. Methane wash column 104 is connected to carbon monoxide/methane fractionator 106 by a means for feeding a portion of the methane-enriched liquid fraction 35. The means for feeding a portion of the methane-enriched liquid fraction 35 may include any known means for conveying fluid, for example conduits, pipes, tubes and the like, as well as valves and vessels.

A CO-containing vapor feed 23 may be condensed to provide a CO-containing condensate 24. At least a portion of the CO-containing condensate 24 may be introduced into the carbon monoxide/methane fractionator 106 as reflux.

Figure 3:
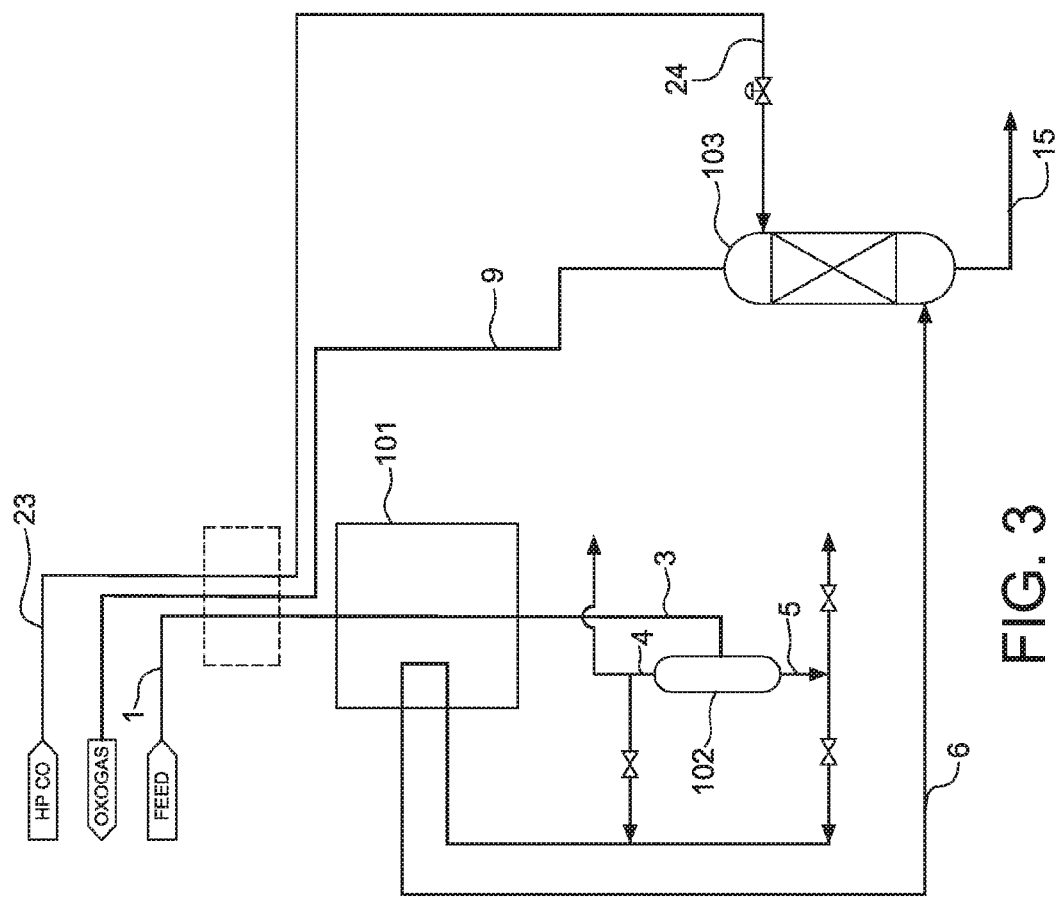
FIG. 3 illustrates another process flow diagram for producing a product gas having a desired $H_2$:CO molar ratio.
Figure 4:
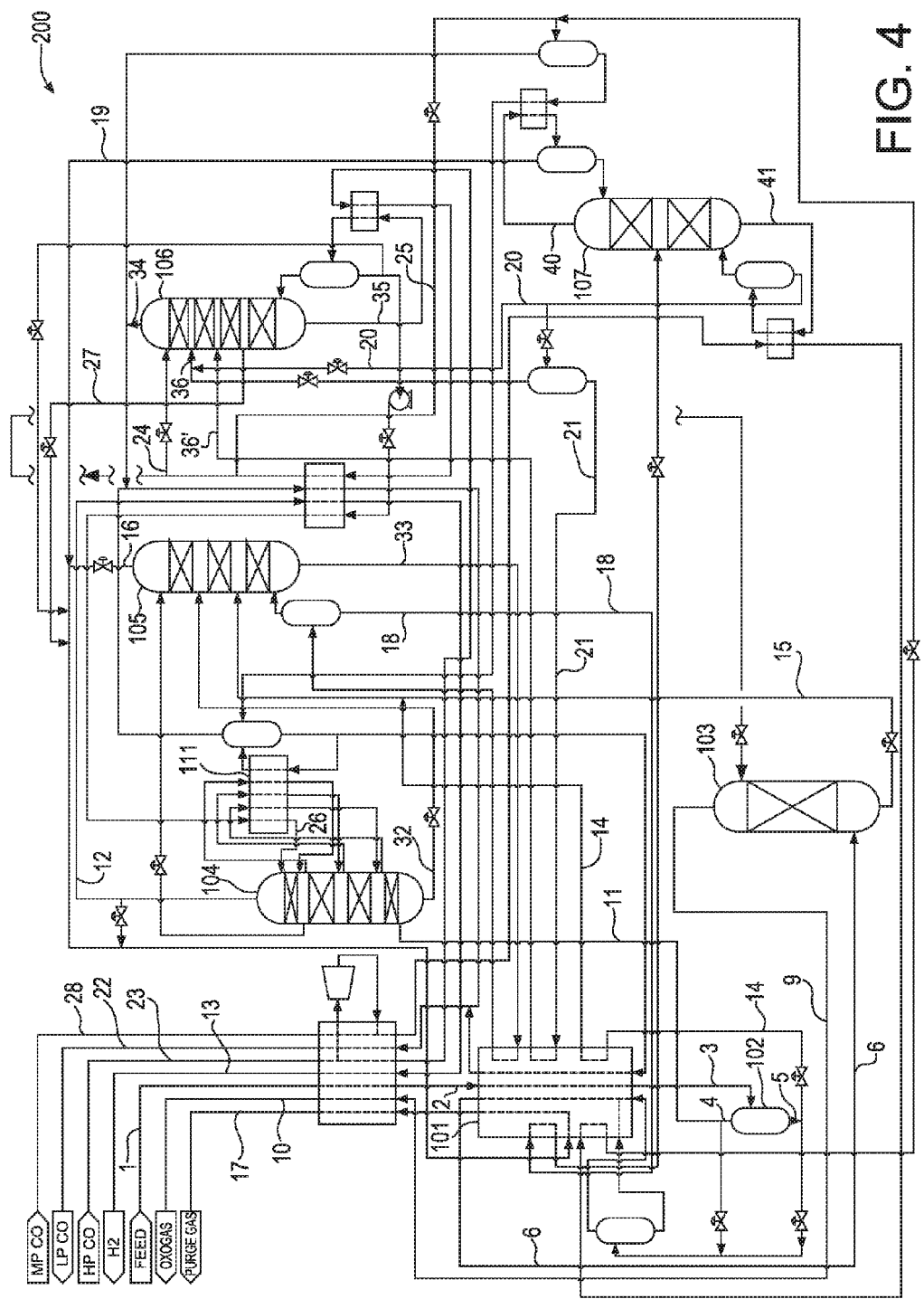
FIG. 4 illustrates another exemplary process flow diagram 200 for producing a product gas having a desired $H_2$:CO molar ratio as well as a hydrogen product gas and a carbon monoxide product gas.

A slight variation to the process and apparatus for producing a product gas having a desired $H_2$:CO molar ratio from a feed comprising hydrogen, carbon monoxide, methane, and optionally nitrogen is described with reference to FIG. 3 and FIG. 4. With reference to FIG. 3 and FIG. 4, the feed 1 is partially condensed in heat exchanger 101 to form partially condensed feed 3 and separated in phase separator 102 to form hydrogen-enriched vapor fraction 4 and carbon monoxide-enriched liquid fraction 5. The phase separator 102 is in downstream fluid flow communication with heat exchanger 101. The phase separator 102 is connected to heat exchanger 101 by a means for feeding the partially condensed feed 3 to the phase separator 102 from heat exchanger 101. The means for feeding the partially condensed feed may include any known means for conveying a fluid, for example conduits, pipes, tubes and the like, as well as valves and other vessels.

A portion or all of the carbon monoxide-enriched liquid fraction 5 is combined with a regulated portion of the hydrogen-enriched vapor fraction 4 to form two-phase admixture 6 having a vapor fraction and a liquid fraction. The portion or all of the carbon monoxide-enriched liquid fraction 5 and the regulated portion of the hydrogen-enriched vapor fraction 4 may be combined using any means for combining said streams, for example, pipe T junctions, tanks, vessels or other device having at least two inlets and at least one outlet.

At least a portion of the liquid fraction of the two-phase admixture 6 and/or at least a portion of the carbon monoxide-enriched liquid fraction 5 are partially vaporized in the heat exchanger 101 to convert a portion thereof to the vapor fraction. These streams may be fed to heat exchanger 101 by a means for feeding said streams, for example, conduits, pipes, tubes and the like, valves, vessels or other known means for conveying fluids.

At least a portion of the two-phase admixture 6 is cryogenically separated in fractionator 103 to form the product gas 9 and a hydrogen-depleted liquid fraction 15. The two-phase admixture 6 is fed to fractionator 103 by a means for feeding the two-phase admixture 6, for example conduits, pipes, tubes and the like, valves, vessels or other known means for conveying fluids. A CO-containing vapor feed 23 is condensed to provide a CO-containing condensate 24. At least a portion of the CO-containing condensate 24 is introduced into fractionator 103 as reflux. The benefit of using fractionator 103 is to decrease the methane concentration in the product gas 9 and allows for higher concentrations of methane in the feed 1.

At least a portion of the two-phase admixture 6 is cryogenically separated in fractionator 103 to form a product gas 9 and a hydrogen-depleted liquid fraction 15. Product gas 9 has the desired $H_2$:CO molar ratio, which may be between 0.5:1 and 2.5:1 or between 0.9:1 and 1.5:1 or between 0.9:1 and 1.1:1. The desired $H_2$:CO molar ratio is generally different to the $H_2$:CO molar ratio of the feed 1, thus suitable for downstream processing without further compression. An advantage of the present process and apparatus is to provide a product gas with a desired $H_2$:CO molar ratio at a suitable pressure without further compression.

The portion of the hydrogen-enriched vapor fraction 4 is regulated (i.e. adjusted) to affect the $H_2$:CO molar ratio of the product gas 9. The total flow rate of the product gas 9 may be controlled by adjusting the quantity of carbon monoxide-enriched liquid fraction 5 and the $H_2$:CO molar ratio may be controlled by adjusting the quantity of hydrogen-enriched vapor fraction 4. Flow rates may be regulated by valves or other known means. The composition of the product gas 9 may be measured, a signal sent to a controller where the controller provides a signal to the valve(s) to adjust the flow rates in a prescribed manner. The flow rate of the carbon monoxide-enriched liquid fraction 5 is increased when an increase in the total flow rate of the product gas 9 is desired. The flow rate of the hydrogen-enriched vapor fraction is increased when an increase in the $H_2$:CO molar ratio is desired. The flow rate of the hydrogen-enriched vapor fraction is decreased when a decrease in the $H_2$:CO molar ratio is desired. Product gas 9 may exchange heat with other process streams as shown before being withdrawn from the system.

Production of a hydrogen product gas and carbon monoxide product gas in addition to the product gas having the desired $H_2$:CO molar ratio is described with reference to FIG. 4.

A second portion 11 of hydrogen-enriched vapor fraction 4 is scrubbed with a liquid methane wash stream 26 in methane wash column 104 to provide hydrogen product gas 12 and carbon monoxide-loaded methane liquid 32. Heat of absorption is removed in heat exchanger 111 using liquid carbon monoxide as refrigerant. The second portion 11 of hydrogen-enriched vapor fraction 4 is fed to methane wash column 104 by a means for feeding the second portion 11 for example, conduits, pipes, tubes and the like, valves, vessels or other known means for conveying fluids. Hydrogen product gas 12 may exchange heat with various process streams as shown before being withdrawn from the system. Optionally, a small portion of the stream withdrawn to form the hydrogen product gas 12 may be taken off and blended to form the purge gas stream 17.

Hydrogen is stripped from a second portion 14 of the carbon monoxide-enriched liquid fraction 5 and hydrogen-depleted liquid fraction 15 in fractionator 105 to form hydrogen-enriched vapor fraction 16 and hydrogen-freed liquid fraction 18. The hydrogen-enriched vapor fraction 16 is reduced in pressure and mixed with other reject streams, warmed in heat exchangers and leaves the process as purge gas stream 17. Fractionator 105 is reboiled in part of heat exchanger 101. The hydrogen-freed liquid fraction 18 is subcooled in heat exchanger 101, and reduced in pressure. Fractionator 105 is in downstream fluid flow communication of phase separator 102. Fractionator 105 is connected to phase separator 102 by a means for feeding the second portion 14 of the carbon monoxide-enriched liquid fraction 5. Fractionator 105 is in downstream fluid flow communication of fractionator 103. Fractionator 105 is connected to fractionator 103 by a means for feeding hydrogen-depleted liquid fraction 15 to fractionator 105 from fractionator 103. The means for feeding the second portion 14 of the carbon monoxide-enriched liquid fraction 5 and the means for feeding hydrogen-depleted liquid fraction 15 may include any known means for conveying a fluid, for example conduits, pipes, tubes and the like, as well as valves and other vessels. Carbon monoxide-enriched liquid fraction 14 may be heated in heat exchanger 101 prior to being introduced into fractionator 105.

At least a portion of the hydrogen-freed liquid fraction 18 may be further processed to form an intermediate feed 36, 36' which is separated in carbon monoxide/methane fractionator 106 to form a carbon monoxide product gas 34 and a methane-enriched liquid fraction 35. Carbon monoxide/methane fractionator 106 is in downstream fluid flow communication of fractionator 105. Carbon monoxide/methane fractionator 106 is connected to fractionator 105 by a means for feeding hydrogen-freed liquid 18 to carbon monoxide/methane fractionator 106 from fractionator 105. The means for feeding hydrogen-freed liquid fraction 18 may include any known means for conveying a fluid, for example conduits, pipes, tubes and the like, as well as valves and other columns and vessels.

Optionally, in case it is desired to remove nitrogen, hydrogen-freed liquid fraction 18 may be separated in fractionator 107 to form a nitrogen-enriched vapor fraction 40 and a nitrogen-depleted liquid fraction 41. If used, fractionator 107 is in downstream fluid flow communication of fractionator 105. Fractionator 107 is connected to fractionator 105 by a means for feeding the hydrogen-freed liquid fraction 18. The means for feeding the hydrogen-freed liquid fraction 18 may include any known means for conveying a fluid, for example conduits, pipes, tubes and the like, as well as valves and vessels. A portion of nitrogen-depleted liquid fraction 41 may be heated and introduced into fractionator 107 as reboil.

At least a portion of nitrogen-depleted liquid fraction 41 is used to form intermediate feed 36, 36', which is introduced into and separated in carbon monoxide/methane fractionator 106 to form carbon monoxide product gas 34 and methane-enriched liquid fraction 35. Carbon monoxide/methane fractionator 106 is connected to fractionator 107 by a means for feeding the intermediate feed 36, 36'. The means for feeding intermediate feed 36, 36' may include any known means for conveying fluid, for example conduits, pipes, tubes and the like, as well as valves and vessels.

A portion of nitrogen-depleted liquid fraction 41 may be divided into a first nitrogen-depleted stream 21 and a second nitrogen depleted stream 20. The first nitrogen-depleted stream 21 may be partially vaporized in heat exchanger 101 and fed to carbon monoxide/methane fractionator 106 as part of intermediate feed 36, 36'. The partially vaporized nitrogen-depleted stream and the second nitrogen-depleted stream 20 are separated in carbon monoxide/methane fractionator 106 to form carbon monoxide product gas 34 and methane-enriched liquid fraction 35.

A portion of methane-enriched liquid fraction 35 is heated to provide vapor boil-up, which is returned to carbon monoxide/methane fractionator 106 to provide stripping vapor. A portion of methane-enriched liquid fraction 35 may be used to form at least a portion of liquid methane wash stream 26. The benefit of forming the liquid methane wash stream from the liquid bottoms of carbon monoxide/methane fractionator 106 is that little methane from outside the system is required and the methane is already cold. Methane wash column 104 is in downstream fluid flow communication of the carbon monoxide/methane fractionator 106. Methane wash column 104 is connected to carbon monoxide/methane fractionator 106 by a means for feeding a portion of the methane-enriched liquid fraction 35. The means for feeding a portion of the methane-enriched liquid fraction 35 may include any known means for conveying fluid, for example conduits, pipes, tubes and the like, as well as valves and vessels.

A CO-containing vapor feed 23 may be condensed to provide a CO-containing condensate 24. A first portion of the CO-containing condensate 24 may be introduced into the carbon monoxide/methane fractionator 106 as reflux and a second portion of the CO-containing condensate 24 may be introduced into the first fractionator 103 as reflux.

EXAMPLE

The process shown in FIG. 2 was simulated using Aspen Plus® 2004.1. Table 1 summarizes the mass balance for streams referred to in the process flow diagram of the FIG. 2. For the vapor fraction, 1 means all vapor, and 0 means all liquid.

Modeling studies have shown that there is a significant power savings (about 20%) compared to blending hydrogen and carbon monoxide product streams.

The process of the present invention reduces the cost and improves the efficiency of syngas production by reducing the size of a carbon monoxide heat pump/product compressor.

TABLE 1

| Stream | 1 | 2 | 3 | 4 | 5 | 6 | 7 |
|---|---|---|---|---|---|---|---|
| Parameter | | | | | | | |
| $H_2$ (mole %) | 64.97 | 64.97 | 64.97 | 85.79 | 5.55 | 32.75 | 34.94 |
| $N_2$ (mole %) | 0.40 | 0.40 | 0.40 | 0.24 | 0.85 | 0.64 | 0.80 |
| CO (mole %) | 29.28 | 29.28 | 29.28 | 13.58 | 74.07 | 53.57 | 64.19 |
| $CH_4$ (mole %) | 5.35 | 5.35 | 5.35 | 0.38 | 19.53 | 13.04 | 0.06 |
| Flow rate (kgmol/h) | 5522.2 | 5522.2 | 5522.2 | 4089.2 | 1433.0 | 1276.7 | 1221.4 |
| Pressure (MPa) | 3.07 | 3.04 | 2.99 | 2.99 | 2.99 | 2.89 | 2.89 |
| Temperature (° C.) | 14.0 | −139.7 | −179.3 | −179.3 | −179.3 | −147.2 | −156.7 |
| Vapor fraction (mole) | 1.0000 | 1.0000 | 0.7403 | 1.0000 | 0.0000 | 0.8619 | 1.0000 |
| Stream | 8 | 9 | 10 | 11 | 12 | 13 | 14 |
| Parameter | | | | | | | |
| $H_2$ (mole %) | 34.94 | 51.20 | 51.20 | 85.79 | 99.01 | 99.01 | 5.55 |
| $N_2$ (mole %) | 0.80 | 0.69 | 0.69 | 0.24 | 0.03 | 0.03 | 0.85 |
| CO (mole %) | 64.19 | 48.09 | 48.09 | 13.58 | 0.00 | 0.00 | 74.07 |
| $CH_4$ (mole %) | 0.06 | 0.02 | 0.02 | 0.38 | 0.96 | 0.96 | 19.53 |
| Flow rate (kgmol/h) | 1221.4 | 785.3 | 785.3 | 3656.4 | 3040.1 | 3040.1 | 589.0 |
| Pressure (MPa) | 2.88 | 2.88 | 2.85 | 2.99 | 2.97 | 2.92 | 0.69 |
| Temperature (° C.) | −162.8 | −162.8 | 23.4 | −179.3 | −180.6 | 23.4 | −172.0 |
| Vapor fraction (mole) | 0.6429 | 1.0000 | 1.0000 | 1.0000 | 1.0000 | 1.0000 | 0.1779 |

TABLE 1-continued

| Stream | 15 | 16 | 17 | 18 | 19 | 20 | 21 |
|---|---|---|---|---|---|---|---|
| Parameter | | | | | | | |
| $H_2$ (mole %) | 3.26 | 91.53 | 38.65 | 0.01 | 6.76 | 0.00 | 0.00 |
| $N_2$ (mole %) | 0.57 | 1.41 | 1.08 | 0.51 | 71.70 | 0.40 | 0.34 |
| CO (mole %) | 62.32 | 2.51 | 1.62 | 44.12 | 21.54 | 44.16 | 40.79 |
| $CH_4$ (mole %) | 33.85 | 4.55 | 58.65 | 55.36 | 0.00 | 55.44 | 58.87 |
| Flow rate (kgmol/h) | 491.4 | 117.9 | 453.8 | 2801.7 | 4.5 | 1319.2 | 1376.6 |
| Pressure (MPa) | 0.69 | 0.66 | 0.21 | 0.66 | 0.45 | 0.46 | 0.28 |
| Temperature (° C.) | −165.2 | −175.5 | 23.4 | −160.6 | −180.5 | −166.6 | −173.1 |
| Vapor fraction (mole) | 0.2479 | 1.0000 | 1.0000 | 0.0000 | 1.0000 | 0.0000 | 0.0000 |

| Stream | 22 | 23 | 24 | 25 | 26 | 27 |
|---|---|---|---|---|---|---|
| Parameter | | | | | | |
| $H_2$ (mole %) | 0.00 | 0.00 | 0.00 | 0.00 | 0.00 | 0.00 |
| $N_2$ (mole %) | 0.90 | 0.90 | 0.90 | 0.90 | 0.00 | 0.00 |
| CO (mole %) | 99.10 | 99.10 | 99.10 | 99.10 | 0.00 | 1.89 |
| $CH_4$ (mole %) | 0.01 | 0.01 | 0.01 | 0.01 | 100.00 | 98.11 |
| Flow rate (kgmol/h) | 3110.7 | 1423.1 | 396.3 | 786.4 | 1290.7 | 181.4 |
| Pressure (MPa) | 0.23 | 2.72 | 2.58 | 2.58 | 3.08 | 0.28 |
| Temperature (° C.) | 11.1 | 40.0 | −180.2 | −180.2 | −181.0 | −150.3 |
| Vapor fraction (mole) | 1.0000 | 1.0000 | 0.0000 | 0.0000 | 0.0000 | 0.0000 |

| Stream | 28 | 31 | 32 | 33 | 34 |
|---|---|---|---|---|---|
| Parameter | | | | | |
| $H_2$ (mole %) | 0.00 | 5.68 | 3.48 | 0.05 | 0.00 |
| $N_2$ (mole %) | 0.90 | 1.01 | 0.44 | 0.56 | 0.90 |
| CO (mole %) | 99.10 | 93.19 | 33.30 | 46.36 | 99.10 |
| $CH_4$ (mole %) | 0.01 | 0.13 | 62.78 | 53.02 | 0.01 |
| Flow rate (kgmol/h) | 444.6 | 436.1 | 1481.1 | 2962.2 | 1639.3 |
| Pressure (MPa) | 0.94 | 2.88 | 2.99 | 0.66 | 0.28 |
| Temperature (° C.) | 40.0 | −162.8 | −174.2 | −161.9 | −181.6 |
| Vapor fraction (mole) | 1.0000 | 0.0000 | 0.0000 | 0.0000 | 1.0000 |

| Stream | 35 | 36 | 36' | 40 | 41 |
|---|---|---|---|---|---|
| Parameter | | | | | |
| $H_2$ (mole %) | 0.00 | 0.00 | 0.00 | 0.15 | 0.00 |
| $N_2$ (mole %) | 0.00 | 0.46 | 0.34 | 71.16 | 0.54 |
| CO (mole %) | 0.00 | 47.42 | 40.79 | 28.70 | 51.80 |
| $CH_4$ (mole %) | 100.00 | 52.12 | 58.87 | 0.00 | 47.66 |
| Flow rate (kgmol/h) | 1936.9 | 1420.7 | 1376.6 | 596.2 | 3379.6 |
| Pressure (MPa) | 0.28 | 0.28 | 0.28 | 0.45 | 0.46 |
| Temperature (° C.) | −147.6 | −173.1 | −162.2 | −179.2 | −168.4 |
| Vapor fraction (mole) | 0.0000 | 0.1352 | 0.4997 | 1.0000 | 0.0000 |

Although the present invention has been described as to specific embodiments or examples, it is not limited thereto, but may be changed or modified into any of various other forms without departing from the scope of the invention as defined in the accompanying claims.

We claim:

1. A process for separating a feed comprising hydrogen, carbon monoxide, methane, and optionally nitrogen, comprising:
   partially condensing the feed to provide a hydrogen-enriched vapor fraction and a carbon monoxide-enriched liquid fraction;
   combining at least a portion of the carbon monoxide-enriched liquid fraction with a regulated portion of the hydrogen-enriched vapor fraction to form a two-phase admixture having a vapor fraction and a liquid fraction;
   cryogenically separating at least a portion of the two-phase admixture in a first fractionator to form a methane-depleted vapor fraction and a hydrogen-depleted liquid fraction;
   partially condensing the methane-depleted vapor fraction to form a first product gas and a condensate, wherein the first product gas has a $H_2$:CO molar ratio between 0.5:1 and 2.5:1; and
   introducing at least a portion of the condensate into the first fractionator as reflux;
   scrubbing a second portion of the hydrogen-enriched vapor fraction with a liquid methane wash stream to provide a hydrogen product gas and a carbon monoxide-loaded methane liquid;
   wherein at least one of the liquid fraction of the two-phase admixture and the at least a portion of the carbon monoxide-enriched liquid fraction are partially vaporized.

2. The process of claim 1 wherein the first product gas $H_2$:CO molar ratio is between 0.9:1 and 1.5:1.

3. The process of claim 1 further comprising:
   stripping hydrogen from a second portion of the carbon monoxide-enriched liquid fraction and at least a portion of the hydrogen-depleted liquid fraction in a second fractionator to form a second hydrogen-enriched vapor fraction and a hydrogen-freed liquid fraction; and separating an intermediate feed comprising carbon monoxide and methane in a carbon monoxide/methane fractionator to form a carbon monoxide product gas and a methane-enriched liquid fraction, wherein the intermediate feed is formed from at least a portion of the hydrogen-freed liquid fraction.

4. The process of claim 3 further comprising:

condensing a CO-containing vapor feed to provide a CO-containing condensate; and introducing at least a portion of the CO-containing condensate into the carbon monoxide/methane fractionator as reflux.

5. The process of claim 3 further comprising:

forming at least a portion of the liquid methane wash stream from a portion of the methane-enriched liquid fraction.

* * * * *